Nov. 4, 1930.  H. C. NASCHKE, JR  1,780,761
THREAD GUARD CASTER
Filed Nov. 17, 1928
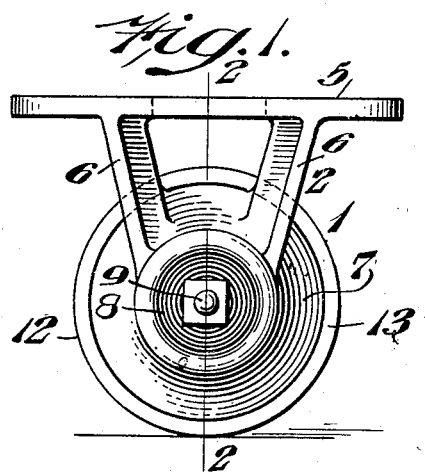
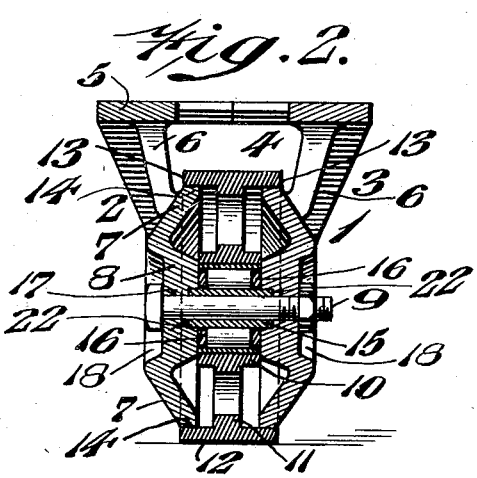
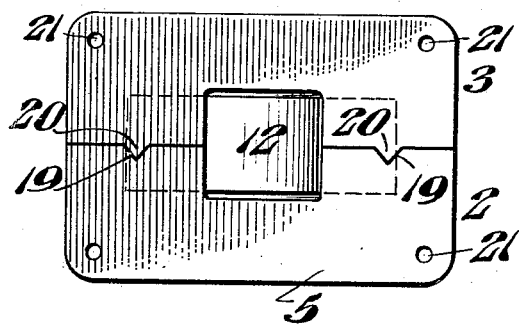
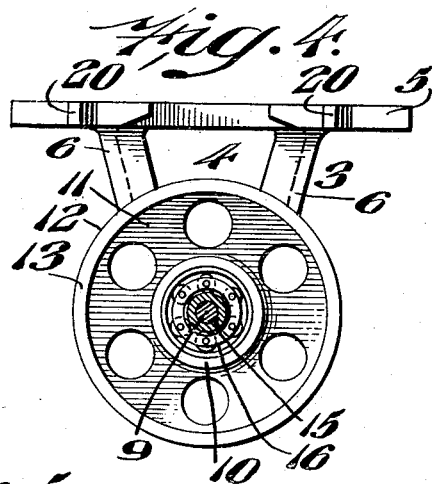
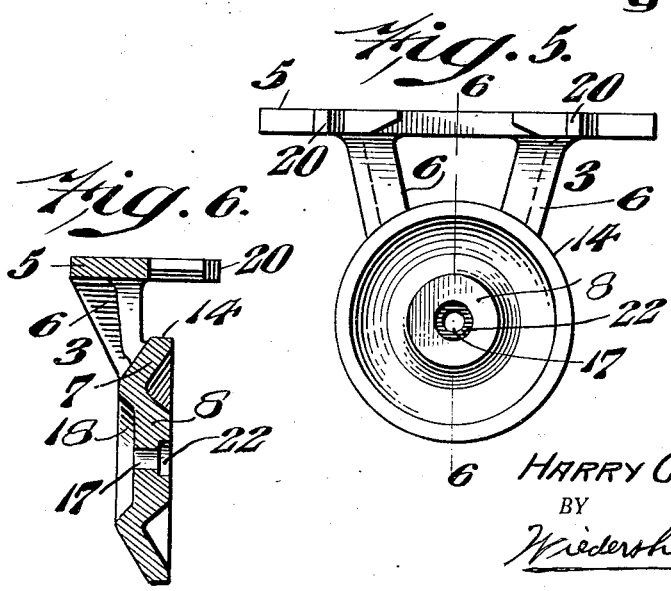
INVENTOR.
HARRY C. NASCHKE, JR.
BY
Wiedersheim Fairbanks
ATTORNEYS.

Patented Nov. 4, 1930

1,780,761

UNITED STATES PATENT OFFICE

HARRY C. NASCHKE, JR., OF PHILADELPHIA, PENNSYLVANIA, ASSIGNOR TO MORRIS TRUCK AND WHEEL CO. INC., OF PHILADELPHIA, PENNSYLVANIA, A CORPORATION OF PENNSYLVANIA

THREAD-GUARD CASTER

Application filed November 17, 1928. Serial No. 320,096.

My invention relates to a novel construction of a caster which is adapted and designed to support racks, trays, trucks, boxes and the like and is especially designed to prevent the adhering and winding upon the caster axles of threads, lint, shavings and the like, which may be caught up on the floor over which the casters travel.

A further object of my invention is to provide a novel caster housing which is made in sections which are substantially duplicates and are provided with peripheral, inwardly converging, stationary, outer annular walls, whose peripheral edges are overhung by the outer peripheral edges of the caster so that there is no liability of threads, lint or other débris being taken up by the tread of the caster or wound upon the axle thereof, since the contiguous peripheral outer sloping walls of the housing sections will tend to guide threads, lint and the like away from the caster proper, and from the interior or the axle or bearings thereof.

It further consists of a caster having the novel housing hereinabove described and an axle joining the housing sections in combination with a ball bearing element common to said axle and the caster, whereby friction is reduced to a minimum.

It further consists of a novel construction of a sectional caster housing, the base sections of which are adapted to interlock.

A further object of my invention is to simplify the mounting of the caster wheels and to provide a construction of caster wheel mounting equipped with a novel roller bearing which can be readily lubricated.

It further consists of other novel features of construction and advantage, all of which will be hereinafter pointed out in the specification and claims appended hereto.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 1 represents a side elevation of a thread guard caster, embodying my invention.

Figure 2 represents a section on line 2—2 of Figure 1.

Figure 3 represents a plan view of Figure 1.

Figure 4 represents a side elevation showing one of the caster housings removed, the caster and its roller bearing being shown in assembled position.

Figure 5 represents an inner side elevation of one of the caster housings, with the caster seen in Figure 4 removed.

Figure 6 represents a section on line 6—6 of Figure 5.

Referring to the drawings in which similar numerals of reference indicate corresponding parts, 1 designates my novel construction of caster, the same comprising two outer housings 2 and 3 and the caster 4, and since the construction of said housings is substantially the same, a description of one will suffice for both.

Each housing section as 2, is provided with the base portion 5, from which depends the downwardly converging arms 6 which merge into the housing body or annular, inwardly converging peripheral portion or wall 7, which is cast or integral with the central thickened portion 8 of said housing section which has the hole 17 through which passes the bolt 9, which serves as an axle for the caster 4.

The caster 4 is provided with the hub portion 10 and the perforated web portion 11 which carries the annular tread 12 whose peripheral edges 13 overhang the terminal edges 14 of the inwardly converged walls or flanges 7 of each housing section, as will be understood from Figure 2. 15 designates a sleeve having its ends positioned in the seats 22 in the thickened central portions 8 of the housing sections, as will be understood from Figure 2; said sleeve forming a part of the ball or roller bearing 16, which is composed of the rollers and cages therefor as is customary, said roller bearing being confined between the sleeve 15 and the hub portion 10 of the caster 4, as will be understood from Figure 4.

In Figures 5 and 6, there is clearly shown one of the seats 22 in which the ends of the sleeve 15 are positioned, the hole 17 being for the passage of the bolt or axle 9. There is a slight depression as indicated at 18 in the outer wall of each housing section for the reception of the head or nut of the bolt or axle 9. As will be apparent from Figure 3, the base member 5 is provided with V-shape seats 19 which receive the V-shape projections 20, so that the housing sections when assembled together and bolted through the holes 21 to the rack, truck or the like will in conjunction with the bolt or axle 9 cause all the parts accurately to align when the same are assembled. The parts are shown in assembled position in Figures 1, 2 and 3, and it will be apparent that when it is desired to have access to the interior it is only necessary to unscrew the nut from the bolt or axle 9 whereupon the parts can be readily separated and the ball bearings or caster 4 and the housing sections are readily accessible. When it is desired to assemble the parts, it is only necessary to place the housing sections in juxtaposition as seen in Figures 2 and 3, with the caster and ball bearings in the position shown and then to insert the bolt or axle 9 and tighten the nut thereon.

I desire to call especial attention to the fact that by reason of the caster edges 13 overhanging the peripheral edges 14 of the housing sections, a sufficiently nice fit is formed so that in practice while the caster 4 can freely revolve, threads, lint, dirt, shavings or the like are prevented from having ingress to the interior of the caster or the axle or bearings thereof.

In practice, whatever threads, lint, shavings or the like are caught up by the tread 12 of the caster 4 slide down the inclined walls 7 of the sectional housings and will not tend to wrap around the axle 9 or to clog the same or the ball bearings therefor.

Attention is called to the fact that the traction surface of the caster, which is the rim or tread 12, is an appreciable distance from the friction surfaces of the roller bearings so that the torque calculated at the friction surfaces is relatively large.

It is apparent that my novel device can be readily and expeditiously made of castings or stampings and that there is a minimum amount of machining or truing up required and that the number of parts is also reduced to a minimum. The housing sections comprising the members 5, 6, 7 and 8 being preferably formed integral result in a rigid and durable construction which will last indefinitely even under the hard usage to which these devices are subjected.

My novel device is especially useful for trucks, racks and the like used in cotton, woolen and textile mills, since my novel construction prevents the lint, threads and the like which litter the floors of such mills, from becoming entangled in the axle or ball bearings as heretofore explained.

It will be apparent from the foregoing that the housings or brackets 2 and 3 are fitted to conform to the inside of the rim of the wheel 4 thereby completely encasing the wheel inside of the tread thereof. The sleeve or steel tubing 15 acts both as an axle and a spacer and the roller bearing turning thereon obviously reduces friction to a minimum. The tubing 15 is held rigid by the bolt 9 passing therethrough and through the sides of the brackets which bolt also completes the assembly of the wheel, and the ends of the tubing being set in the seats or recesses 22 or in the inside of the brackets takes all strain off the bolt and acts as an axle as is evident.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

1. In a device of the character stated, a caster housing composed of a pair of symmetrical sections, each of said sections registering and aligning with the base of the other of said sections and having a base, pendant arms and a body portion having inwardly converging, annular, peripheral outer walls, and a caster rotatably mounted within said housing sections and having a hub, a web, and having a tread whose edges overhang the juxtaposed peripheral edges of said housing sections, said base, arms and body portions of said housing sections being integral.

2. In a device of the character stated, a sectional caster housing composed of a pair of sections, each having a base, pendant arms and a body portion formed integral and having inwardly converging, annular, peripheral, outer walls, a sleeve having one of its ends positioned in a circular recess formed in one of said sections and the other of its ends received in the other of the sections, a caster having an integral hub, a web, and having a tread whose edges overhang the juxtaposed peripheral edges of said housing sections, and a roller bearing interposed between said caster hub and sleeve.

3. In a device of the character stated, a sectional caster housing composed of a pair of sections each having a base, pendant arms and a body portion formed integral therewith and having inwardly converging annular, peripheral, outer walls, a sleeve having its opposed ends positioned in circular recesses in said sections, a caster having a hub, a web and tread whose edges overhang the peripheral edges of said housing sections, a roller bearing interposed between said caster hub and said sleeve, and a bolt passing said housing sections and sleeve and serving both as an axle for said caster and to secure said caster and housing sections in assembled position.

4. A device of the character described comprising a caster having a hub, a tread, a web connecting said hub and tread, a sectional caster housing formed of a pair of identical sections, each section having a base, pendant arms and inwardly converging outer walls, said walls serving to enclose said web and hub therebetween, there being internal annular seats in said walls, a sleeve extending through said hub and having its ends in said seats, a roller bearing assembly interposed between the sleeve and the hub, and means extending through the sleeve for holding said sections in position.

HARRY C. NASCHKE, Jr.